United States Patent Office 3,182,004
Patented May 4, 1965

3,182,004
PRODUCTION OF FUNGIMYCIN
Lloyd E. McDaniel, Plainfield, Carl P. Schaffner, Somerville, and Edwin G. Bailey, Somerset, N.J., assignors to Warner-Lambert Pharmaceutical Company, Morris Plains, N.J., a corporation of Delaware
No Drawing. Filed Apr. 18, 1963, Ser. No. 273,857
5 Claims. (Cl. 195—80)

This invention is concerned with improvements in or relating to the production of the antibiotic fungimycin.

Fungimycin, also known as perimycin, NC 1968 or aminomycin, is a novel basic heptane antifungal antibiotic which may be produced by the submerged aerobic culture of Streptomyces coelicolor var. aminophilus in a suitable nutrient medium. Thus, in U.S. Patent No. 2,956,925 is described a process for the production of said antibiotic by culturing S. coelicolor var. aminophilus NRRL 2390 under certain conditions. This process, while quite satisfactory, is somewhat limited in that extensive purification steps are usually necessary to yield a therapeutically acceptable antibiotic.

As generally practiced hitherto, the submerged aerobic culture of S. coelicolor var. aminophilus to yield fungimycin has been carried out in a nutrient medium wherein the nitrogen requirements have been provided by the so-called organic nitrogenous materials, e.g., beef extracts, yeast extracts, and the carbohydrate requirements have been provided by dextrose or starch.

After carrying out additional studies upon the production of fungimycin by the technique described in said patent, we have now found it to be highly advantageous to substitute corn steep liquor and a suitable soya bean meal preparation for part of the organic nitrogenous material previously employed in forming the nutrient medium. In addition, we have also found it to be advantageous to replace the previously employed seed culture of S. coelicolor var. aminophilus NRRL 2390 by a certain isolate of S. coelicolor var. aminophilus obtained by a method of subculturing to be hereinafter described in detail. These modifications apart from substantially reducing fermentation costs and thus being highly advantageous from an economic point of view also enable a substantial improvement in yield to be obtained. In addition, the culture medium employed in the process of this invention apart from being simple, readily available and inexpensive also has the added advantage that the fungimycin formed can be readily extracted therefrom after the fermentation is halted.

We have also discovered that the recovery of fungimycin from the fermentation medium can be substantially improved by first quenching and then extracting the fermentation medium with n-butanol. The fungimycin thus separated from the fermentation medium may then be precipitated from the n-butanol fraction in substantially pure form.

In accordance with this invention we therefore provide an improved process for the production of fungimycin by the submerged aerobic culture of S. coelicolor var. aminophilus NRRL 2390 utilizing a particular nutrient medium and especially by culturing the isolate IMRU 3865 of said S. coelicolor var. aminophilus in said medium. Our invention also encompasses an improved recovery process for the extraction and separation of the fungimycin thus formed from the culture medium.

The isolate IMRU 3865 referred to above has been obtained by subculturing S. coelicolor var. aminophilus NRRL 2390 in the nutrient described hereinafter as Medium #2 and of the composition given below. The inoculated Medium #2 is then incubated at 28° C. for about 10 days. During this 10 day period, an aliquot portion of the medium is aseptically withdrawn from time to time and then extracted with n-butanol. The amounts of fungimycin present in the several butanol extracts collected at the various time intervals involved is then compared by measuring the amount of light absorption at 383 m$\mu$ in a spectrophotometer. The standard used as a comparison is 1% w./v. pure solution of fungimycin in methanol, the $\epsilon$ of which is 1000. We have found that the production of antibiotic is highest after about 6 days' incubation. A loopful of said 6 day old culture is then subcultured on a fresh solid media such as Medium #2 agar. After a few days incubation, well separated colonies are selected at random and are transferred onto Medium #2 agar slants. After the isolates have grown and sporulated, each one is transferred to inoculum medium (Medium #2) in shake flasks and incubated for two days. At this time transfers are made to shake flasks containing production medium (Medium #4). The amount of fungimycin produced is determined at intervals as described above. The isolate which gives the highest yield of fungimycin has been deposited with and is available from the Institute of Microbiology, Rutgers, The State University, New Brunswick, New Jersey, having been incorporated in their permanent culture collection of microorganisms as IMRU 3865. As in the case of other organisms the seed culture IMRU 3865 can be preserved by suspending the organisms in sterile skim milk, lyophilizing the suspension and then storing the lyophilized culture at about $-10°$ to $-20°$ C.

The outstanding advantage of employing S. coelicolor var. aminophilus NRRL 2390 IMRU 3865 as a seed for the production of fungimycin is its capacity to produce said fungimycin efficiently with especially high yields and purity being obtained with the modified nutrient medium hereinafter described.

The modified nutrient medium we employ in our improved process comprises the combination in tap water of corn steep liquor and soya bean meal. In general, a concentration by weight of 2.0 to 12.0% of corn steep liquor and 1.0% to 3.0% of soya bean meal in said aqueous medium is quite satisfactory. As an example of a soya bean meal which can be employed in our process there may be mentioned the commercially available Staley's special nutrient 4-S (A. E. Staley Manufacturing Company).

An assimilable carbon source which is especially suitable for inclusion in the above medium is cerelose. A 1.0% to 3.5% by weight concentration in the nutrient medium has been found to be satisfactory. The desired amount of cerelose can be added to the aqueous corn steep liquor and aqueous soya bean meal nutrient medium and the resulting medium then sterilized by autoclaving. However, it is generally preferred that the cerelose is sterilized separately and the sterile solution of cerelose then added to the other components forming the nutrient medium just before the introduction of the seed culure. If the cerelose is included in the medium prior to sterilization, a shorter strilization period is desirable to prevent decomposition of cerelose.

For optimum results certain other process conditions are recommended. The pH of the nutrient medium should be adjusted to 7 to 7.6 prior to sterilization. The pH can be so adjusted, for example, by adding sufficient aqueous sodium hydroxide. We also prefer to incorporate an antifoaming agent in the nutrient medium as a sterile aqueous suspension during the course of the fermentation. Suitable antifoam agents are the dimethylpolysiloxanes available commercially under proprietary names such as Antifoam AF (Dow Corning) or GE-60 Antifoam (General Electric).

In general, we prefer to introduce as the inoculum from about 0.05 to 2 ml. of a vegetative culture of *S. coelicolor* var. *aminophilus* for each 100 ml. of the nutrient medium employed. The inoculum is preferably introduced into the medium as a two day old vegetative culture.

In conducting the aerobic fermentation, it is essential to have an abundant supply of air and this is preferably accomplished by introducing sterile air into the nutrient medium during the growth phase. We have found that when the volume of medium employed is about 1000 liters contained in a 300 gallon tank, adequate aeration is provided by an air flow rate of 4 to 8 c.f.m. Generally, it is desirable to initiate the fermentation at higher air flow rates, the flow rate then being decreased as the culture grows.

The agitation of the culture can be accomplished by any conventional stirring device. Thus, for example, an anchor-type agitator comprising 3 blades which are 27.5 cm. by 10 cm. in dimensions, in combination with a 300 gallon fermentation tank, is quite satisfactory. The rate of agitation, of course, varies with the size and shape of the tank but for a conventional 300 gallon tank containing 1000 liters of medium adequate agitation can be maintained by rotating the said 3 bladed agitator at about 100 r.p.m., the rotation being decreased as the fermentation proceeds.

Generally, good yields of fungimycin are obtained after growing the inoculated culture at 28° to 30° C. for about 6 days, under the conditions described above.

The fermentation process is preferably terminated when there is about 230–300 µg./ml. of fungimycin present in the culture medium. This preferably effected by introducing n-butanol into the fermentation vessel. The rate or level of antibiotic production is determined by taking an aliquot portion of the medium and extracting it with n-butanol. The n-butanol extract is then separated and its fungimycin content assayed by measuring the amount of light absorption at 383 mµ in a spectrophotometer. Instead of assaying for fungimycin content we can also conveniently use the glucose concentration and the pH of the media as an indicator for halting the fermentation. Thus, when the glucose concentration is about 2 mg./ml. and the pH is about 8.5 there is about 230–300 µg./ml. of fungimycin present.

A ratio of 3 parts by volume of n-butanol to 10 parts by volume of the culture medium is generally sufficient to halt the fermentation and to extract the desired antibiotic.

The butanol fraction containing the desired fungimycin can be readily separated from the aqueous phase by subjecting the alcoholic-aqueous mixture to a gravitational force of at least 13,000 g. until separation of the two phases are effected.

The desired fungimycin may be readily recovered by the removal of the solvent. However, we have found the following sequence of steps particularly suitable.

Step I comprises the concentration of the butanol extract by evaporation of the solvent at about 40° to 50° C. to about one-fifteenth of the original volume.

The concentrated butanol extract is then continuously washed with water of pH 6.4. A commercially available liquid-liquid counter-current extractor such as a York-Scheibel extractor is particularly suited for this purpose.

Step II comprises the precipitation of fungimycin from the water washed butanol extract by a substantially butanol-immiscible inert volatile organic solvent. In general, we find the addition of about an equal volume of petroleum ether at about 4° to 10° C. a preferable way of precipitating the desired fungimycin. Other solvents, such as ethyl ether, acetone, and the like, are also suited for this purpose. The precipitated fungimycin is then lyophilized and stored as a lyophilized powder.

The following examples are included in order further to illustrate this invention.

The compositions of the various sterile media used in the following examples and designated as Medium #2 Medium #4 and YED, respectively, are given below.

Medium #2: | Percent
--- | ---
Corn steep liquor | 2
Cerelose | 1
Special nutrient 4–S (A. E. Staley Mfg. Co.) | 1
Tap water to 100%. | 
pH adjusted with NaOH to 7.3–7.4. | 
Sterilize 20 minutes at 120° C. |

Medium #2 Agar: Medium #2 plus 2% agar.

Medium #4: | Percent
--- | ---
Corn steep liquor | 6
Cerelose | 3
Special nutrient 4–S | 2
Tap water to 100%. | 
pH adjusted with NaOH to 7.3–7.4. | 
Sterilize 20 minutes at 120° C. |

YED: | Percent
--- | ---
Bacto yeast extract | 1
Cerelose | 1
Tap water to 100%. | 
pH 7.0. | 
Sterilize 30 minutes at 120° C. |

EXAMPLE 1

*Preparation of starter inoculum*

A stock culture of *S. coelicolor* var. *aminophilus* NRRL 2390 IMRU 3865 maintained on Medium #2 agar slant is suspended in 3.0–5.0 ml. of sterile distilled water having pH 6.4. Approximately 0.5 ml. of the above suspension is transferred aseptically into a flask containing about 50 ml. of Medium #2. The inoculated medium is then incubated at 28° C. for 48 hours on a rotary shaker running at approximately 220 r.p.m. and the flask describing a circle of about 2.5 centimeters in diameter.

EXAMPLE 2

*Preparation of seed inoculum for 300 gallon fermentor*

Into a flask containing about 500 ml. of YED Medium is inoculated 10 ml. of a 48 hour starter culture obtained in accordance with Example 1. The inoculated YED Medium is incubated at about 28° C. on a rotary shaker at 220 r.p.m. and the flask describing a circle about 2.5 centimeters in diameter. After 48 hours of incubation, if the medium is free of contamination, it can now be used as a seed culture as described in Example 3.

EXAMPLE 3

*Propagation of S. coelicolor var. aminophilus in a 300 gallon fermentor*

Into a 300 gallon stainless steel fermentor containing 1000 liters of Medium #4 and 400 ml. of Dow Corning Antifoam AF is added 200 ml. of *S. coelicolor* var. *aminophilus* obtained in accordance with Example 2. The inoculated medium is then incubated at 28° C. During the course of fermentation, aeration is provided by introducing sterile air into the tank at a rate of about 8 c.f.m. for the first 28 hours and about 4 c.f.m. for the remainder of the fermentation cycle. Agitation of the medium is provided by employing a 3 bladed anchor-type agitator, the blades being 27.5 by 10 cms. The agitator is run at 100 r.p.m. for the first 28 hours and at 75 r.p.m. for the remainder of the fermentation cycle.

EXAMPLE 4

*Isolation and recovery of fungimycin*

When the culture broth contains about 230 to 300 µg./ml. of fungimycin the fermentation is terminated by injecting 300 liters of n-butanol into the fermentor. The mixture is agitated in the fermentor for two hours and then centrifuged in a Sharples #16 Super Centrifuge at 13,000×g until phase separation occurs.

The n-butanol extract is concentrated to ⅓ the original volume in a Rodney Hunt Turbofilm evaporator, using a 685 mm. of vacuum and 110° C. on the jacket. This gives a temperature of 50° C. on the outlet side. The concentrated n-butanol extract is washed with distilled water of pH 6.4 in an 11 plate York-Scheibel continuous liquid-liquid counter-current extractor. The flow rate of the n-butanol extract from the bottom is adjusted to 0.2 gallon per minute and the water flow rate from the top is adjusted to 0.1 gallon per minute. The outlet flow of washed n-butanol extract is adjusted to 0.15 to 0.20 gallon per minute.

The water washed n-butanol extract is then concentrated to 1/15 of the original volume in the Rodney Hunt evaporator under the conditions described above. An equal volume of petroleum ether at 4° to 10° C. is then added to effect precipitation of fungimycin.

The precipitate is lyophilized after separation from the liquid by centrifugation. The supernate is further separated into (1) aqueous phase, (2) hold up in the centrifuge and (3) petroleum ether-butanol solube portion. Each of these portions is also lyophilized to yield an additional crop. The combined yield of fungimycin is about 100 to 120 grams.

It is understood that the foregoing detailed description is given merely by way of illustration and that many variations may be made therein without departing from the spirit of our invention.

Having described our invention, what we desire to secure by Letters Patent is:

1. Process for the production of fungimycin which comprises inoculationg a fungimycin producing species of *Streptomyces coelicolor* var. *aminophilus* NRRL 2390 IMRU 3865 into an aqueous medium containing assimilable sources of carbon and nitrogen, allowing the growth to proceed at about 28° C. under submerged aerobic conditions until the concentration of fungimycin in the media is at least 230 to 300 μg./ml. extracting said fungimycin by the addition of n-butanol and subjecting the resulting mixture to a gravitational force to effect separation of the butanol fraction.

2. Process for the isolation of fungimycin which comprises concentrating the butanol extract obtained in accordance with claim 1, washing said butanol extract with water having a pH of 6.4, precipitating the fungimycin with a member selected from the group consisting of petroleum ether, acetone and ethyl ether and recovering the precipitated fungimycin.

3. Process in accordance with claim 1, wherein said assimilable nitrogen source is a mixture of corn steep liquor and soya bean meal.

4. Process in accordance with claim 1 wherein said assimilable source of carbon is cerelose.

5. Process for the isolation of fungimycin which comprises concentrating the butanol extract obtained in accordance with claim 1 to about 1/15 of the original volume, washing said butanol extract with water having a pH of 6.4, precipitating the fungimycin with about an equal volume of petroleum-ether, separating the precipitated fungimycin and lyophilizing said precipitated fungimycin.

References Cited by the Examiner

UNITED STATES PATENTS

| | | | |
|---|---|---|---|
| 2,872,373 | 2/59 | Siminoff | 167—65 |
| 2,956,925 | 10/60 | Wooldridge | 167—65 |
| 2,972,569 | 2/61 | Oliver et al. | 195—80 |
| 2,990,325 | 6/61 | Donovick et al. | 195—80 |
| 2,992,162 | 7/61 | Waksman et al. | 167—65 |

A. LOUIS MONACELL, *Primary Examiner.*